June 2, 1970   A. F. WICKERSHAM, JR., ET AL   3,515,935
TRIGGERED SPARK TRANSMITTER DEVICE
Filed May 31, 1967   3 Sheets-Sheet 1
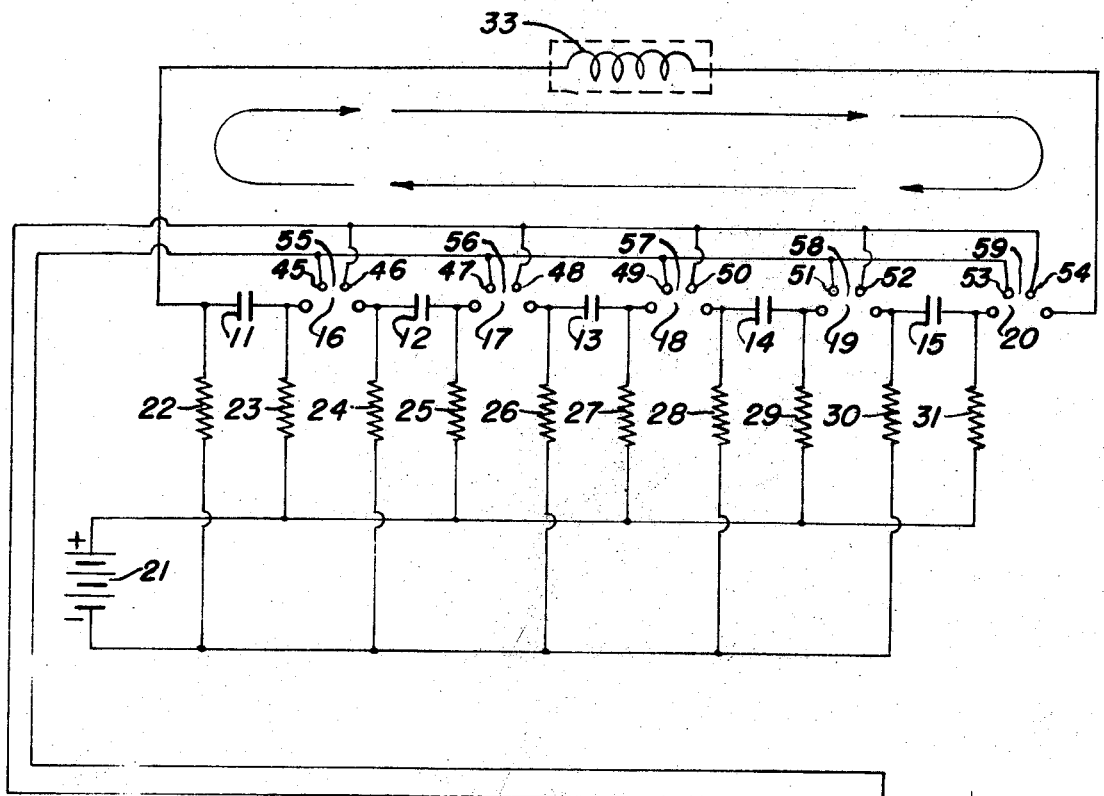
FIG. 1
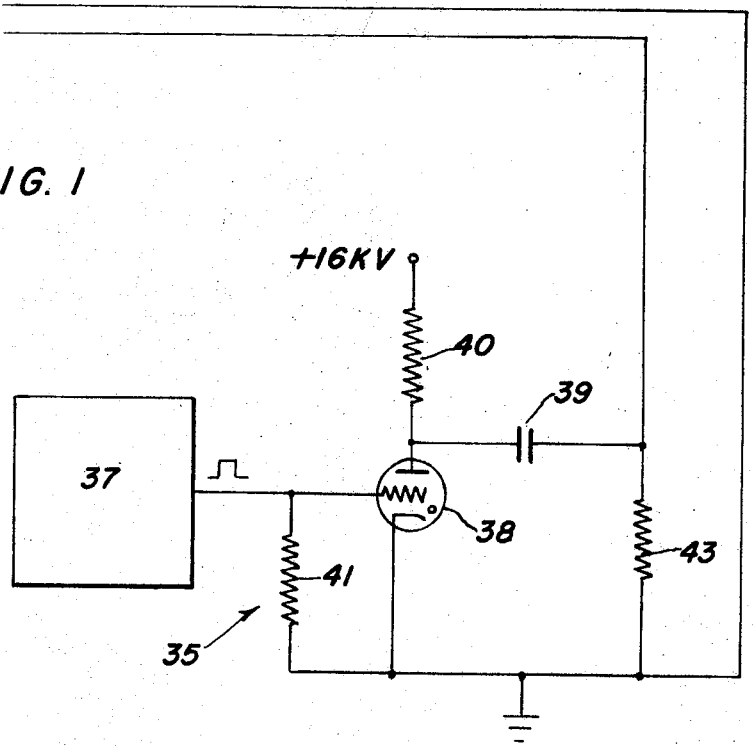
INVENTORS
ARTHUR F. WICKERSHAM, JR.
LAMBERT T. DOLPHIN, JR.
BY
Charles J. B. Curry INVENTORS
ARTHUR F. WICKERSHAM, JR.
LAMBERT T. DOLPHIN, JR.
BY
Charles J B Curry INVENTORS
ARTHUR F. WICKERSHAM, JR.
LAMBERT T. DOLPHIN, JR.
BY
Charles B Curry / 3,515,935
TRIGGERED SPARK TRANSMITTER DEVICE
Arthur F. Wickersham, Jr., Atherton, and Lambert T. Dolphin, Jr., Palo Alto, Calif., assignors, by mesne assignments, to the United States of America as represented by the Secretary of the Navy
Filed May 31, 1967, Ser. No. 643,327
Int. Cl. H01j 7/24; H01b 31/26
U.S. Cl. 315—111  4 Claims

ABSTRACT OF THE DISCLOSURE

A spark transmitter having a plurality of storage capacitors and spark gaps arranged in series where the spark gaps are simultaneously rendered conducting by a trigger device. The trigger device comprises a plurality of pairs of trigger electrodes where each pair is positioned adjacent the respective spark gap and in a pressurized gaseous atmosphere capable of being ionized. The trigger electrodes are simultaneously energized and thereby ionize the gaseous atmosphere in the spark gaps and permit electric discharge of the storage capacitors.

---

The invention described herein may be manufactured and used by or for the Government of the United States of America for governmental purposes without the payment of any royalties thereon or therefor.

The present invention relates to a power generation apparatus that is activated by a trigger device.

It is well known that radio waves can be generated by storing electricity in a capacitor and suddenly discharging it through a conductor. A convenient means for effecting this sudden discharge of stored energy is through a spark gap which breaks down when the capacitor has been charged to a predetermined energy lovel. Such a radio wave generating system has a frequency limitation which is primarily based on the self-inductance of the capacitors of the system. The frequency of oscillation of a capacitor-inductor-spark system is given by the relationship $f = 1/(2\pi\sqrt{LC})$ where $f$ is the frequency of oscillation, L is the inductance and C is the capacitance. From this it can be seen that if high frequencies are desired, the inductance, L, or the capacitance, C, or both, must be kept small. Since the radiated power is proportional to the stored energy, very large powers can be radiated only by the use of large capacitors. However, with large capacitors it is difficult to maintain the inductance, L, small, and therefore the self-inductance and lead-inductance of the large capacitors preclude high frequency operation. For many applications it is desirable to have both high power and high frequency radio wave generation.

One technique for achieving the generation of high frequencies and high powers which has been previously purposed is the utilization of capacitors arranged in a circle, charged in parallel, and discharged in series through spark gaps disposed between the capacitors. This has been referred to as a spark ring transmitter and by using this transmitter it is possible to achieve very large series potentials of many millions of volts even though the charging potentials are only tens of kilovolts. Although this type of spark transmitter has many applications, the loop inductance of the ring is tuned to resonance by the capacitance distributed around the ring which provides an inherent peak power limitation since it is difficult to extend the frequencies to higher ranges without serious reduction of capacitance. Another type of spark transmitter comprises a plurality of storage capacitors and spark gaps arranged in series and in a straight line where the spark gaps are alternately positioned between the capacitors. A low inductance outer cylindrical conductor and conducting end plates enclose and electrically connect the line of capacitors and spark gaps to provide a low inductance return current path. The line of capacitors and spark gaps function as an inner conductor. In operation, the capacitors are initially charged to operating potential and then discharged across the spark gaps. The discharge of the capacitors results in current flow through the inner conductor (comprising the capacitors and spark gaps), the low impedance end plates, and the outer conductor. Since the distributed inductance and capacitance between the inner and outer conductors is similar to that of a coaxial transmission line, the geometry being similar, the inductance of the return path can be made very small by making the diameter of the inner conductor almost as large as the diameter of the outer conductor. Thus, very high frequencies can be achieved even though the series capacitors are quite large which is necessary in order to achieve large power. Radio energy can be obtained from these devices through coupling loops or probes placed in the cylinder.

In order that the radio frequency power of these spark transmitters be within an order of magnitude of the power initially stored, and if the frequency spectrum of the radio frequency energy is to be narrow and well-defined, it is essential that the capacitors be discharged coherently, that is, all of the spark discharges be established simultaneously across all of the capacitors. The simultaneity required is such that the jitter times, the time differences between the establishment of spark discharges in all of the capacitor gaps, be small compared to a period of the radio frequency energy. In addition, the development of high conductivity in the spark gaps must occur in a time smaller than a radio frequency period. For example, radio frequency energy at 100 megacycles per second has a period of 10 nanoseconds and therefore the spark gap jitter times should not exceed one nonosecond if coherent, high power energy is to be generated in a relatively narrow frequency band. These problems have been overcome and an extremely high degree of simultaneity has been achieved by the trigger device of the present invention.

An object of the present invention is to provide a transmitter having a trigger device that results in the capacitors of the transmitter discharging with a high degree of simultaneity.

Briefly, the present invention is a trigger device for spark transmitters having capacitor spark gaps formed between adjacent capacitor electrodes. The trigger device comprises a plurality of pairs of trigger electrodes where each pair is positioned adjacent to the respective capacitor spark gap and in a pressurized gaseous atmosphere capable of being ionized. By pressurizing the spark gaps it is possible to decrease the spark gap distance, at a given voltage, which has the effect of making it possible to more rapidly render the spark gap conducting. In addition, the shorter spark gap offers less resistance to the flow of electric energy and results in less wasted power by the generation of undesirable heat which is extremely important in high power spark transmitters. The trigger electrodes are preferably made of carbon which results in less jitter. The trigger electrodes are preferably located in one of the capacitor electrodes since this provides optimum shielding and the ultraviolet photons are concentrated directly in the spark channel, between the capacitor electrodes, which provides optimum electron density and efficiency. The trigger electrodes are connected in parallel and are activated by a fast rise time pulse. When the fast pulse discharges across the trigger electrodes it produces an ultraviolet flash near each capacitor spark gap. The atoms between the trigger electrodes directly emit ultraviolet photons because of the electromagnetic field generated by the charge placed across the trigger electrodes. These ultraviolet photons are emitted extremely rapidly, from $10^{-12}$ to $10^{-18}$ seconds, and have resulted in jitter times as low as a few tenths of a nanosecond. After the initial emission of ultraviolet photons the atoms in the gap channel absorb the photons and, in the process of being ionized, emit electrons which are accelerated and cause subsequent ionization by collision, eventually completely ionizing the gas into a conducting plasma. Because of the initial volume ionization by the ultraviolet light, rather than starting the process with a single, or a few, electrons, the formation of a conducting plasma occurs more rapidly than it would otherwise. With the ultraviolet light technique of the present invention conducting plasma is formed in from about 2 to about 10 nanoseconds. In addition, this ultraviolet light technique results in jitter times of only about 0.3 to about 0.5 nanosecond. Therefore, it is extremely desirable to effectively utilize the initial emission of ultraviolet photons to ionize the pressurized gas between the capacitor electrodes. The effective utilization of the initially emitted ultraviolet photons is achieved by pressurizing the gas to be ionized which permits positioning the capacitor electrodes more closely together, for a given operating voltage, and focusing the initial ultraviolet photon beam in the path which is to be ionized and which is to conduct the discharged current across the capacitor spark gaps.

Other objects and many of the attendant advantages of this invention will be readily appreciated as the same becomes better understood by reference to the following detailed description when considered in connection with the accompanying drawings wherein:

FIG. 1 is a schematic diagram of the electrical circuit of the present invention;

Figure 2:
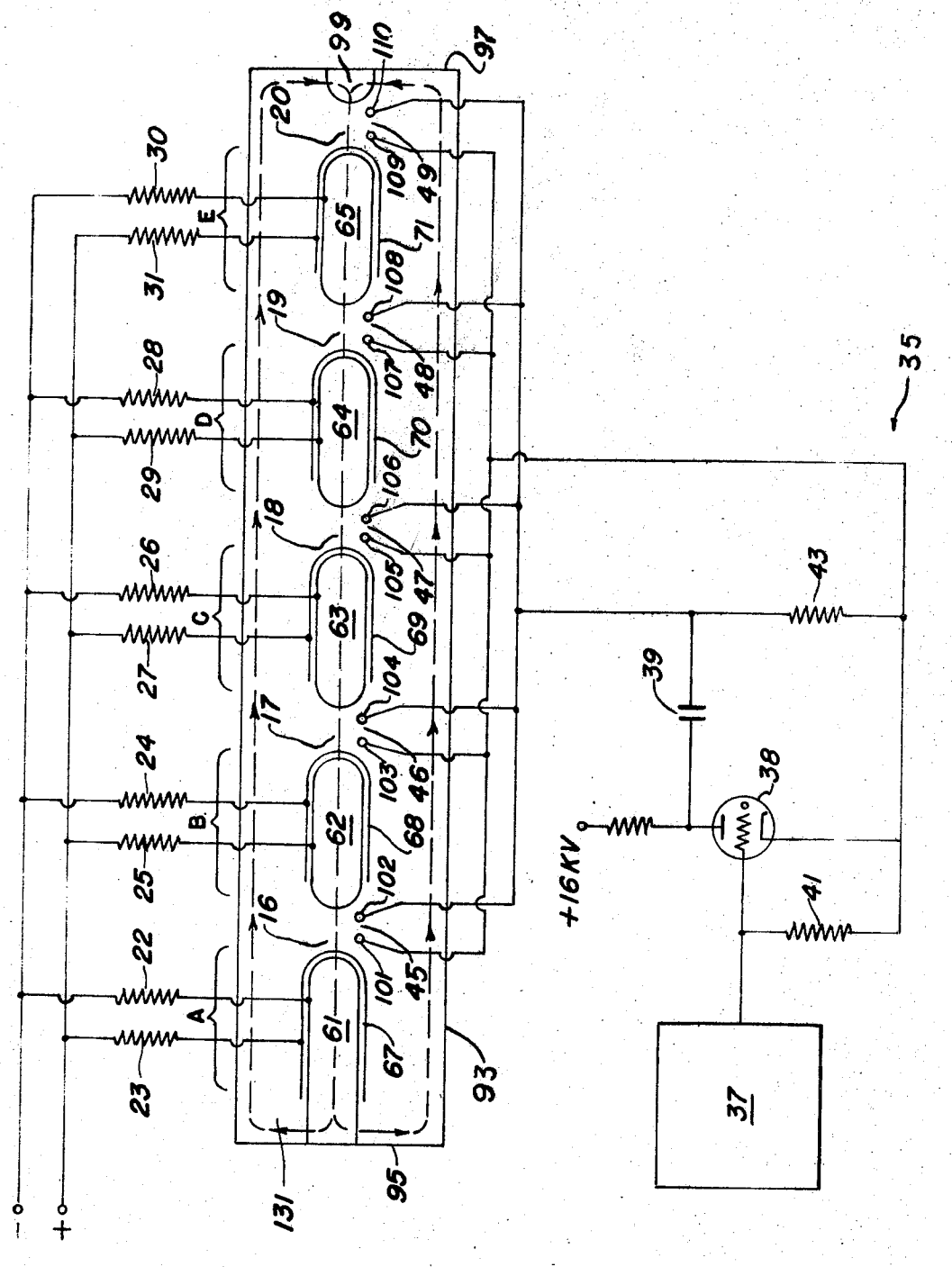
FIG. 2 is a schematic diagram of the present invention wherein the mechanical placement of the electrical elements, the inner and outer conductors and the trigger electrodes are illustrated.

FIG. 1 is a schematic diagram illustrating the electrical circuit of the present invention. In this circuit capacitors 11 through 15 are connected in series through spark gaps 16 through 20. Capacitors 11 through 15 are charged by direct current source 21 through resistors 22 through 31. It should be noted that the capacitors are charged in parallel through resistors 22 through 31 and are then discharged in series through equivalent inductance 33. The discharge current flow path is illustrated by the solid line arrows. In the preferred embodiment all of capacitors 11 through 15 have the same values, spark gaps 16 through 20 have the same characteristics, and resistors 22 through 31 have the same values. This is because it is desirable, within allowable limits, to have all of the capacitors 11 through 15 discharged at the same time and from the same level. Trigger circuit 35 of the present invention functions to cause the simultaneous discharge of capacitors 11 through 15 respectively across spark gaps 16 through 20. The trigger device includes trigger circuit 35 and trigger electrodes 45 through 54.

Timing circuit 37 of trigger circuit 35 provides timing pulses that are applied to the grid of grid controlled thyratron 38. A DC power source, for example, 16 kv., is connected to the cathode of thyratron 38 and to one side of capacitor 39 through resistor 40. Resistor 41 is connected to the output of timing circuit 37 and to ground. Resistor 43 is connected to one side of capacitor 39 and to ground. Electrodes 45 through 54 form five pairs of electrodes forming trigger spark gaps 55 through 59. Electrodes 45, 47, 49, 51 and 53 are connected to one side of capacitor 39 through thyratron 38 and electrodes 46, 48, 50, 52 and 54 are connected directly to the other side of capacitor 39. It can be therefore seen that the pairs of trigger electrodes respectively for each of spark gaps 16 through 20 are connected in parallel and are simultaneously excited by the discharge of capacitor 39 when thyratron 38 is activated by the output pulse from timing circuit 37. In practice, the transmission lines to each pair of trigger electrodes are longer than the common transmission line from the thyratron. This provides isolation, so that the discharge of one pair of electrodes does not reduce the trigger pulse voltage to such an extent that none of the other trigger gaps are discharged.

Each of capacitors 11 through 15 are charged in the same manner and therefore a description of capacitor charging will be given only for capacitor 11. A potential is applied across capacitor 11 through resistors 22 and 23 by direct current source 21. Resistors 22 and 23 have relatively large resistance to isolate the radio frequency signals generated by the series discharge of capacitors 11 through 15 and to prevent short-circuiting or overloading of the DC supply when the capacitors are discharged. It should be noted, however, that the value of resistors 22 and 23 must not be so large as to prevent the charging of capacitor 11 to its required value within the required time limit, that is, during the interim between discharges.

In operation, each of capacitors 11 through 15 are charged at the same rate through resistors 22 through 31 to a predetermined value. This predetermined value is determined by the breakdown voltage across spark gaps 16 through 20. When the capacitors are charged to a value slightly less than their breakdown voltage the trigger device is activated thereby causing simultaneous discharge of capacitors 11 through 15 across spark gaps 16 through 20. When this occurs, a current pulse flows through equivalent inductance 33 as indicated by the current path shown by the solid line arrows. The capacitors are then recharged by direct current source 21 and the process repeated. Equivalent inductance 33 is the combined inductance of capacitors 11 through 15, spark gaps 16 through 20, capacitor lead lines and the return path of the outer conductor which is described below. The frequency of current pulses is primarily determined by the total series capacitance of capacitors 11 through 15 and the magnitude of equivalent inductance 33. The frequency of operation is defined by the relationship $f = 1/(2\pi\sqrt{LC})$ where $f$ is the frequency of oscillation, L is the inductance and C is the capacitance. Since high frequencies are desired, as well as high power, it is desirable to maintain L at small values.

It is highly desirable that trigger circuit 35 provide simultaneous trigger pulses, to trigger electrodes 45 through 54, that are at a high voltage and have extremely fast rise times such that maximum simultaneity of discharge of capacitors 11 through 15 can be achieved. It is also desirable that the repetition time between pulses be extremely constant. Trigger circuit 35 includes a conventional timing circuit 37 which provides output pulses having extremely rapid rise times and extremely constant repetition periods. The output of timing circuit 37 is applied to the grid of grid controlled thyratron 38 which functions as a gate for the high power discharge of capacitor 39. Capacitor 39 is charged through resistor 40 by a power source having the relatively large voltage of 16,000 volts, for example. Resistor 41 provides a load for timing circuit 37 and resistor 43 functions to hold capacitor 39 above ground potential and to limit the current which would otherwise be discharged by capacitor 39 through thyratron 38 when it is rendered conducting. In operation, when no pulse is being generated by timing circuit 37 and thyratron 38 is non conducting, capacitor 39 will be charged to 16,000 volts, for example, through resistor 40. When a pulse is generated by timing circuit 37, thyratron 38 is rendered conducting and will cause a very rapid voltage change that appears across capacfitor 39 and which also appears simultaneously across spark gaps 55 through 59 thereby causing the discharge of capacitors 11 through 15. Capacitor 39 will continue to discharge until thyratron 38 is rendered non conducting by the termination of the pulse applied to the grid thereof by timing circuit 37. The process is then repeated.

Figure 3:
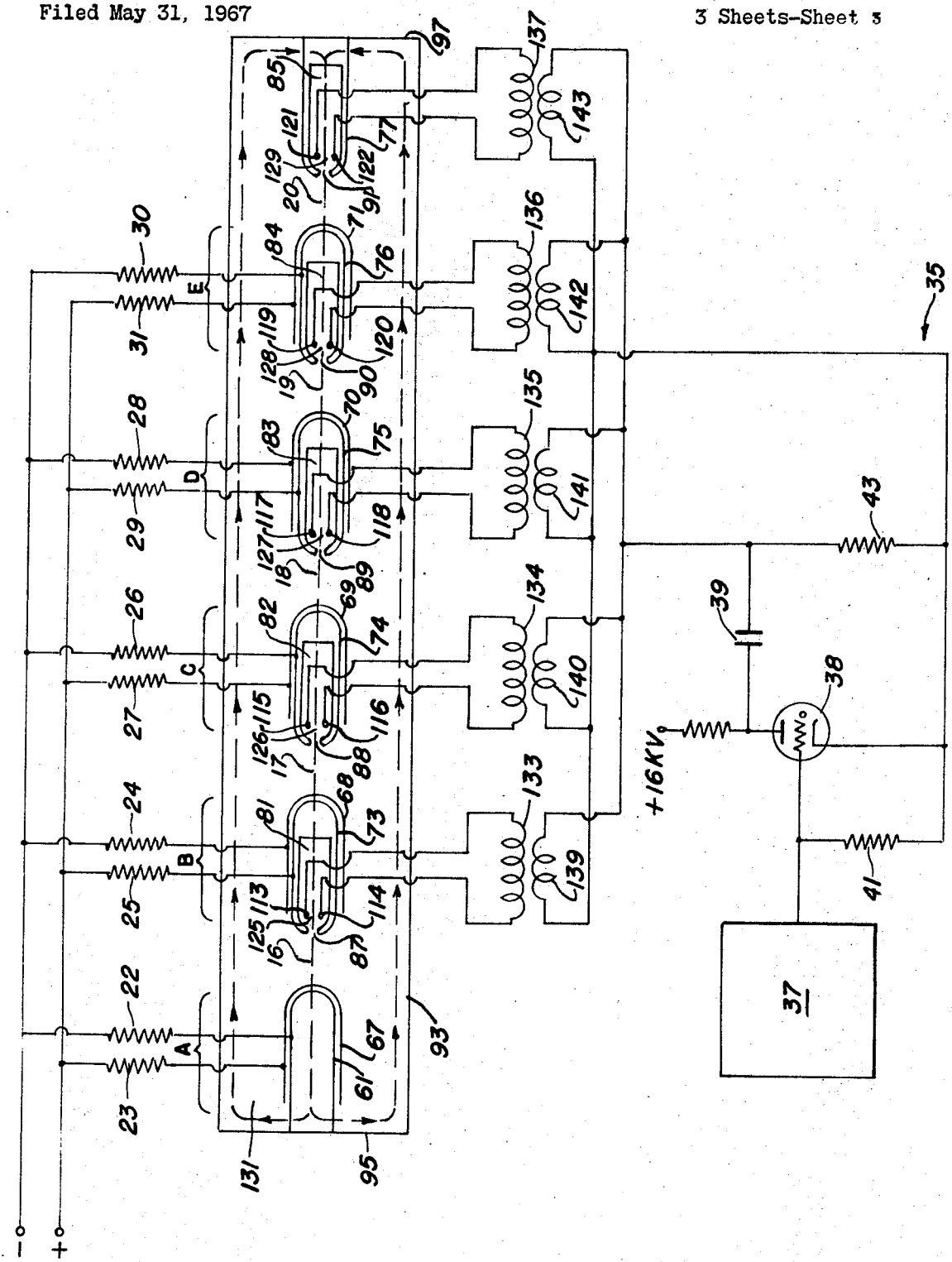
FIG. 3 is a schematic diagram of another embodiment of the present invention where the trigger electrodes are positioned within one of the capacitor electrodes.

In FIGS. 2 and 3 are schematically illustrated the mechanical and electrical configuration of two embodiments of radio frequency power generating device of the present invention. Like reference numerals refer to like features in these two embodiments where the FIG. 2 embodiment has the trigger electrodes positioned radially outward and adjacent to the capacitors spark gaps and the FIG. 3 embodiment has the trigger electrodes positioned in longitudinal alignment with the capacitor spark gap and within one of the capacitor electrodes. Each of these embodiments includes a plurality of capacitive sections indicated by the brackets and associated symbols A, B, C, D, and E. Each of these capacitive sections respectively includes inner cylindrical members and intermediate cylindrical members. In the FIG. 2 embodiment each of inner cylindrical members 61 through 65 preferably solid and have hemispherical ends. Surrounding each of inner cylindrical members 61 through 65 respectively are intermediate cylindrical members 67 through 71. In the FIG. 3 embodiment, each of inner cylindrical members 73 through 76 and cylindrical member 77 have cavities 81 through 85 and have hemispherical ends with one end of each having openings 87 through 91. The other end of cylindrical member 77 is flat and is connected to end plate 97. Surrounding each of inner cylindrical members 61 and 73 through 76 respectively are intermediate cylindrical members 67 through 71. In this manner a capacitor is formed by inner cylindrical member 61 and intermediate cylindrical member 67, which is referred to as capacitive section A. Capacitive sections B through E are formed in the same manner with inner cylindrical members 73 through 76 and intermediate cylindrical members 68 through 71, respectively. Capacitive sections a through E are respectively separated by spark gaps 16 through 20 which together comprise the inner conductor. Outer cylindrical conductor 93 surrounds the inner conductor (capacitive sections A through E and spark gaps 16 through 20) and the trigger electrodes. The periphery of end plate 95 is mechanically and electrically connected to one end of outer conductor 93 and the central region is electrically and mechanically connected to one end of inner cylindrical member 61 of capacitive section A. The periphery of end plate 97 is mechanically and electrically connected to the opposite end of outer cylindrical member 93 and the central region is electrically and mechanically connected to cylindrical member 99 of FIG. 2 and to cylindrical member 77 of FIG. 3.

In the FIG. 2 embodiment electrodes 101 through 110 form trigger spark gaps 45 through 49 and in the FIG. 3 embodiment electrodes 113 through 122 form trigger spark gaps 125 through 129. Trigger spark gaps 45 through 49 are equivalent to trigger spark gaps 125 through 129 and function electrically in the same manner as described with respect to FIG. 1. In the FIG. 2 embodiment trigger spark gaps 45 through 49 are positioned radially outward from spark gaps 16 through 20. In the FIG. 3 embodiment trigger spark gaps 125 through 129 are positioned in longitudinal alignment with capacitor spark gaps 16 through 20 and are disposed within inner cylindrical members 73 through 77.

In each of the FIG. 2 and FIG. 3 embodiments, chamber 131 is filled under pressure with a gas, such as nitrogen, that is capable of being ionized.

Inner cylindrical members 61 through 65 of FIG. 2 and 61 and 73 through 76 of FIG. 3 are alternately charged negative and positive respectively through resistors 22, 25, 26, 29, and 30. Intermediate cylindrical members 67 through 71 are alternately charged positive and negative respectively through resistors 23, 24, 27, 28, and 31. Since capacitive sections A through E are alternately charged, the discharge of these capacitive sections across spark gaps 16 through 20 will result in a series capacitive discharge. The spacing between outer cylindrical conductor 93 and intermediate cylindrical members 67 through 71 is preferably selected to be small so the inductance of the current return path will be small. The spacing and size of inner cylindrical members 61 through 65 and 73 through 76 respectively with respect to intermediate cylindrical members 67 through 71 are selected at values which meet the particular frequency and power (energy storage) requirements.

In the FIG. 2 embodiment, electrodes 102, 104, 106, 108, and 110 are directly connected to one side of capacitor 39 and electrodes 101, 103, 105, 107, and 109 are connected to the other side of capacitor 39 through thyratron 38 of trigger circuit 35. In the FIG. 3 embodiment, electrodes 113 and 114 are connected in series with secondary winding 133, electrodes 115 and 116 in series with secondary winding 134, electrodes 117 and 118 in series with secondary winding 135, electrodes 119 and 120 in series with secondary winding 136 and electrodes 121 and 122 in series with secondary winding 137. Secondary windings 133 through 137 are respectively coupled to primary windings 139 through 143. Primary winding 139 through 143 are connected in parallel across capacitor 39 of trigger circuit 35.

The trigger electrodes of FIGS. 2 and 3 are connected in parallel and are therefore simultaneously activated by each fast rise time pulse generated by trigger device 35. When the fast rise time pulse discharges across the trigger electrodes it produces an ultraviolet flash in the vicinity of the triggering electrodes and the capacitor electrodes. The atoms between the trigger electrodes directly emit ultraviolet photons because of the electromagnetic field generated by the charge placed across the trigger electrodes. The ultraviolet photons are emitted extremely rapidly, from $10^{-12}$ to $10^{-18}$ seconds, and have resulted in jitter times as low as a few tenths of a nanosecond. After the initial emission of ultraviolet photons the subsequent ionization of atoms yields a secondary emission of ultraviolet and visible light which occurs from 5 to 10 nanoseconds after the trigger electrodes have been initially excited. If triggering is accomplished only with this second light emission from the trigger electrodes, jitter times of only about 5 to 10 nanoseconds in the main gap are achieved. From this it can be seen that it is desirable to effectively utilize the initial prompt emission of ultraviolet photons to ionize the pressurized gas between the capacitor electrodes. The effective utilization of the promptly emitted ultraviolet photons is achieved by pressurizing the gas to be ionized which permits positioning the capacitor electrodes more closely together and the positioning of the trigger electrodes adjacent the electron path to be formed between the capacitor electrodes. By being able to position the capacitor electrodes more closely, it is possible to reduce the diameter of the electron path between the capacitor electrodes and therefore position the triggering electrodes more closely to this region and therefore make more effective use of the initially emitted ultraviolet photons. In the FIG. 3 embodiment the trigger electrodes are positioned within cylindrical members 73 through 77. This has the effect of shielding the tirgger electrodes from signals, such as the main high power AC signals generated by the spark transmitter, which reduces the jitter time. Also, an opening is provided at the end of each cylindrical member in which the trigger electrodes are disposed which emits and focuses ultraviolet photons in the path which is most heavily ionized and will conduct the largest amount of current discharged across the spark gaps formed between the adjacent capacitor electrodes.

In order to enhance the number of free electrons generated by the ultraviolet flash, the capacitor electrodes are preferably made of aluminum because aluminum has the lowest surface work function of the readily available metals. Therefore less energy is required to remove an electron from the surface of aluminum than for most other metals. In has been found preferable to make the trigger electrodes from carbon since this has resulted in extremely small jitter times of as low as $1 \times 10^{-10}$ seconds. In the preferred embodiment of the present invention chamber 131 is filled with a gas capable of being ionized at a relatively high pressure. It has been found that nitrogen gas has been very effective and has been used at 40 p.s.i. pressure in transmitters having a frequency of from 6 to 25 mc./sec. In the linear type transmitter shown in FIGS. 2 and 3 the spark gaps have been pressurized as high as 180 p.s.i. Although not generally as desirable for certain applications lower or still higher pressures may be used. By providing an ionizable gas under pressure as above described it is possible to reduce the distance of gaps 16 through 20 which separate the various electrodes. This is because pressurized nitrogen has a higher dielectric strength. Also, by pressurizing the nitrogen the jitter time is reduced which is believed to be due to the availability of a greater density of nitrogen atoms which permits more rapid ionization.

In operation, the current flow paths are as illustrated by the dotted lines shown in FIGS. 2 and 3. It can be seen that the current flow path is through the inner conductor (capacitive sections A through E and spark gaps 16 through 20) across end plates 95 and 97 and along outer cylindrical conductor 93.

Power may be removed from the device by coupling loops or, if direct radiation is desired, simply by removing the outermost cylinder and extending the ends of the inner conductors, symmetrically at either end, to a half-wavelength.

The method for designing transmission devices of the type described above may be as follows. Assuming it is desired to design a 90 mc./sec. transmission device, the following criteria may be employed. The inductance per meter can be computed from the equation for the inductance of a coaxial transmission line which is given by the expression:

$$L = \frac{138}{3} \cdot 10^{-2} \log \frac{D}{10d}$$

where: L is the inductance in microhenries (H) per meter, D is the inside diameter of outer cylindrical conductor 93, and d is the outside diameter of intermediate cylindrical members 67 through 71.

Selecting 10 capacitors of 150 picofarads capacitance, it can be seen that the total series capacitance is 15.0 pf. This series capacitance tunes the inductance to a resonant or operating frequency of $$f = 1/(2\pi\sqrt{LC}) = 86.3 \text{ mc./sec.}$$

In actual operation the resonant frequency was 90 mc./sec. Assuming the capacitors are charged to about 16 kv., the total stored energy per pulse is $$U = 1/2 CV^2 = 1/2(10 \cdot 150 \cdot 10^{-12})(16 \cdot 10^3)^2$$

$$= 0.192 \text{ joules}$$

The length, to half-power amplitude, of the radiated pulse was about 40 μs.; thus, the theoretical peak power was about 0.192 joules/40 μsec. or 4.80 megawatts. By measuring the received power at a distance point, it was determined that the peak power actually radiated was about 0.46 megawatt, which gives an efficiency of about 10 percent.

One embodiment of the present invention has supplied 1 to 5 mw. of peak power at 20 mc./sec. In this embodiment the transmitter was 4 feet long and used 8 storage capacitors of 1500 picofarads capacitance each. This device had the power and frequency capability of the conventional ring transmitter having a diameter of 12 feet and 67 capacitors each with 70 picofarads capacitance. As a further example, a 90 mc./sec. linear device was constructed that was capable of ½ mw. peak power and was only one meter in length. Since there it no limit to the length of these devices, it is possible to build generators capable of hundreds of megawatts peak power.

It is to be understood that in view of the above teachings that other modifications may be made by those skilled in the art and still be within the scope of the present invention. For example, different positions and different materials may be used for the trigger electrodes and capacitor electrodes. Also, different techniques may be used to generate signals to excite the trigger electrodes. For example, the fast rise time pulse that simultaneously activates all of the trigger spark gaps can be generated by discharging a capacitor through a sharpening gap of a coaxial line, the discharge being initiated by a grid controlled thyratron.

Obviously many modifications and variations of the present invention are possible in the light of the above teachings. It is therefore to be understood that within the scope of the appended claims the invention may be practiced otherwise than as specifically described.

We claim:
1. A signal generating device comprising:
 (a) an inner conductor comprising at least one capacitive section and at least one spark gap arranged alternately and in series;
 (b) a hollow outer conductor surrounding said inner conductor;
 (c) a gas capable of being ionized filling said at least one spark gap;
 (d) means operatively connecting one end of said inner conductor to one end of said hollow outer conductor and the other end of said inner conductor to the other end of said hollow outer conductor;
 (e) said at least one capactive section comprising an intermediate cylindrical member surrounding and in spaced relation from an inner cylindrical member;
 (f) said inner cylindrical member having a cavity and an opening at only one end;
 (g) a pair of trigger electrodes positioned in said cavity and forming a trigger spark gap therebetween;
 (h) means for applying a trigger voltage across said pair of trigger electrodes;
 (i) whereby the application of a trigger voltage across said trigger electrodes causes ultraviolet photons to be emitted and focused through said opening thereby heavily ionizing the gas in said spark gap that is in alignment with the focused photons.
2. The device of claim 1 wherein:
 (a) said inner and intermediate cylindrical members are made of aluminum.

3. The device of claim 2 wherein:
(a) said trigger electrodes are made of carbon.
4. The device of claim 3 wherein:
(a) said gas is nitrogen at a pressure of about 40 p.s.i.

References Cited

UNITED STATES PATENTS

| 2,207,509 | 7/1940 | Fewings | 331—130 X |
| 2,241,968 | 5/1941 | Suits | 313—184 |
| 2,932,731 | 4/1960 | Gehlke et al. | 331—127 X |
| 3,317,839 | 5/1967 | Landecker | 325—106 |

JOHN W. HUCKERT, Primary Examiner

R. F. POLISSACK, Assistant Examiner

U.S. Cl. X.R.

313—183, 184, 188, 192, 231, 325; 315—36, 231, 232; 325—106, 107